(12) United States Patent
Gallo et al.

(10) Patent No.: US 12,213,848 B2
(45) Date of Patent: Feb. 4, 2025

(54) SURGICAL GUIDE FOR ZYGOMATIC BONE IMPLANTS

(71) Applicants: Francesco Gallo, Milan (IT); Giulio Negri, Lecco (IT); Francesco Zingari, Milan (IT)

(72) Inventors: Francesco Gallo, Milan (IT); Giulio Negri, Lecco (IT); Francesco Zingari, Milan (IT)

(73) Assignee: NORIS MEDICAL LTD., Nesher (IL)

( * ) Notice: Subject to any disclaimer, the term of this patent is extended or adjusted under 35 U.S.C. 154(b) by 863 days.

(21) Appl. No.: 17/257,203

(22) PCT Filed: Jul. 5, 2019

(86) PCT No.: PCT/IB2019/055739
§ 371 (c)(1),
(2) Date: Dec. 30, 2020

(87) PCT Pub. No.: WO2020/008423
PCT Pub. Date: Jan. 9, 2020

(65) Prior Publication Data
US 2021/0161617 A1    Jun. 3, 2021

(30) Foreign Application Priority Data
Jul. 6, 2018    (IT) .................. 102018000006998

(51) Int. Cl.
*A61C 1/08*    (2006.01)
*A61C 8/00*    (2006.01)

(52) U.S. Cl.
CPC ............ *A61C 1/084* (2013.01); *A61C 8/0034* (2013.01); *A61C 8/0089* (2013.01)

(58) Field of Classification Search
CPC ....... A61C 1/084; A61C 1/0082; A61C 1/008; A61C 17/1785; A61C 17/176;
(Continued)

(56) References Cited

U.S. PATENT DOCUMENTS

| | | |
|---|---|---|
| 2009/0130630 A1 | 5/2009 | Goodman et al. |
| 2010/0256649 A1 | 10/2010 | Capsal et al. |

(Continued)

FOREIGN PATENT DOCUMENTS

| | | |
|---|---|---|
| EP | 2060240 A2 | 5/2009 |
| WO | 2020044335 A1 | 3/2020 |

OTHER PUBLICATIONS

International Search Report (ISR) dated Oct. 7, 2019 issued in International Application No. PCT/IB2019/055739.
(Continued)

*Primary Examiner* — Cris L. Rodriguez
*Assistant Examiner* — Sydney J Pulvidente
(74) *Attorney, Agent, or Firm* — Holtz, Holtz & Volek PC

(57) ABSTRACT

A guide for guided surgery on zygomatic bone implants for dental prostheses includes a half-bushing and a complementary half-bushing which are connected by a pair of bars. The half-bushings and the bars define a common longitudinal median axis between them; the half-bushings have a U-shaped or semicircular cross-section with mutually opposite concavities directed toward the median axis; the half-bushings and the bars form a seat in which it is possible to insert a work member, such as a burr and a subsequent implant, which can move only along the median axis and rotates about an axis of rotation that coincides with the median axis.

8 Claims, 5 Drawing Sheets

(58) Field of Classification Search
CPC ... A61C 8/0089; A61C 8/009; A61B 17/1742; A61B 17/1746; A61B 17/1776; A61B 17/1778
See application file for complete search history.

(56) References Cited

U.S. PATENT DOCUMENTS

| | | | |
|---|---|---|---|
| 2011/0306008 A1 | 12/2011 | Suttin et al. | |
| 2011/0306009 A1 | 12/2011 | Suttin et al. | |
| 2013/0110116 A1* | 5/2013 | Kehres | A61B 17/1739 606/96 |
| 2014/0276879 A1* | 9/2014 | Lin | A61B 17/17 606/96 |
| 2015/0190209 A1 | 7/2015 | Suttin et al. | |
| 2015/0320516 A1 | 11/2015 | Suttin et al. | |
| 2019/0223988 A1* | 7/2019 | Palmer | A61C 8/001 |

OTHER PUBLICATIONS

Written Opinion dated Oct. 7, 2019 issued in International Application No. PCT/IB2019/055739.

* cited by examiner

SURGICAL GUIDE FOR ZYGOMATIC BONE IMPLANTS

The present invention relates to a guide for guided surgery on zygomatic bone implants for dental prostheses.

Implant- and prosthetic-based rehabilitation has developed considerably over the years, solving increasingly critical oral conditions.

Rehabilitation surgery by using zygomatic bone implants is the most modern solution for patients affected by severe maxillary atrophy.

This method uses intra-bone dental implants of considerably increased length which are not inserted exclusively in the maxillary bone, as in traditional implants used so far, but are anchored to the zygomatic bone.

The requirement of special anatomical and surgical knowledge, however, has limited the diffusion and use of this method in the field of everyday dentistry routine, making it usable almost exclusively by a maxillofacial surgeon.

The need to simplify zygomatic bone surgery and render it usable also by the dental surgeon has therefore pushed to evolve the current technique, improving the surgical passages and entrusting it to so-called guided surgery, i.e., a technique which relies on the most modern software to study and simulate beforehand each individual burr pass until the implant is inserted, by means of a guide which rests against the bone, with fixation by means of synthetic screws or pins.

Guided surgery is already known for traditional implants but is not used for zygomatic bone implants.

For example, EP2060240 discloses a kit which includes a surgical guide for guiding the insertion of a dental implant into a desired location in a patient's mouth. The implant includes a non-rotational structure. The surgical guide includes a structure and a master tube. The structure has a negative impression surface to be fitted on and placed over gingival tissue, bone, and/or teeth in the patient's mouth. The structure includes an opening through which the dental implant is placed. The master tube is located at the opening. The master tube includes indicia for alignment with the non-rotational structure on the implant such that the non-rotational structure of the implant is at a known angular orientation with respect to the master tube.

US2010/0256649 discloses a method for providing a three-dimensional solid reproduction of the anatomical zone of implantation and, by means of this reproduction, a device for assisting drilling, which includes a rigid base provided with a guide for a drill. The three-dimensional solid reproduction consists of a reproduction of an internal and peripheral portion of the bone structure that is free, at least in the vicinity of each hole of the implant, from the surrounding non-osseous tissues and mucosa. The rigid base has a contact surface adapted to make contact with a portion of the external surface of the three-dimensional solid reproduction and therefore also later with a peripheral surface portion of the bone structure.

The aim of the present invention is to provide a surgical guide which can be used for zygomatic implants.

Within the scope of this aim, an object of the invention is to provide a surgical guide that allows to precisely guide the burr passes in order to create the receptacle of the implant and the insertion in the bone receptacle of the implant, designed beforehand.

Another object of the invention is to provide a surgical guide with intimate osseous resting contact that is provided specially for each patient.

A further object of the present invention is to provide a structure which, by virtue of its particular constructive characteristics, is capable of giving the greatest assurances of reliability and safety in use.

A further object of the present invention is to provide a structure that can be manufactured easily by using commonly commercially available elements and materials and is also competitive from an economic standpoint.

This aim and these and other objects which will become better apparent hereinafter are achieved by a guide for guided surgery on zygomatic implants for dental prostheses, characterized in that it comprises a first half-bushing and a second half-bushing that are connected by a pair of bars, said half-bushings and said bars defining a common longitudinal median axis between them; said half-bushings having a semicircular cross-section with mutually opposite concavities directed toward said median axis; said half-bushings and said bars forming a seat in which it is possible to insert a work member; said work member being movable along said median axis and rotating about a rotation axis that coincides with said median axis; said first half-bushing being arranged in a crestal maxillary position with vestibular concavity, said first half-bushing determining a working depth of said work member, i.e., the vestibulo-palatal penetration; said second half-bushing being arranged at the zygomatic region.

Further characteristics and advantages will become better apparent from the description of preferred but not exclusive embodiments of the invention, illustrated by way of non-limiting example in the accompanying drawings, wherein.

Figures 1, 2, 3:
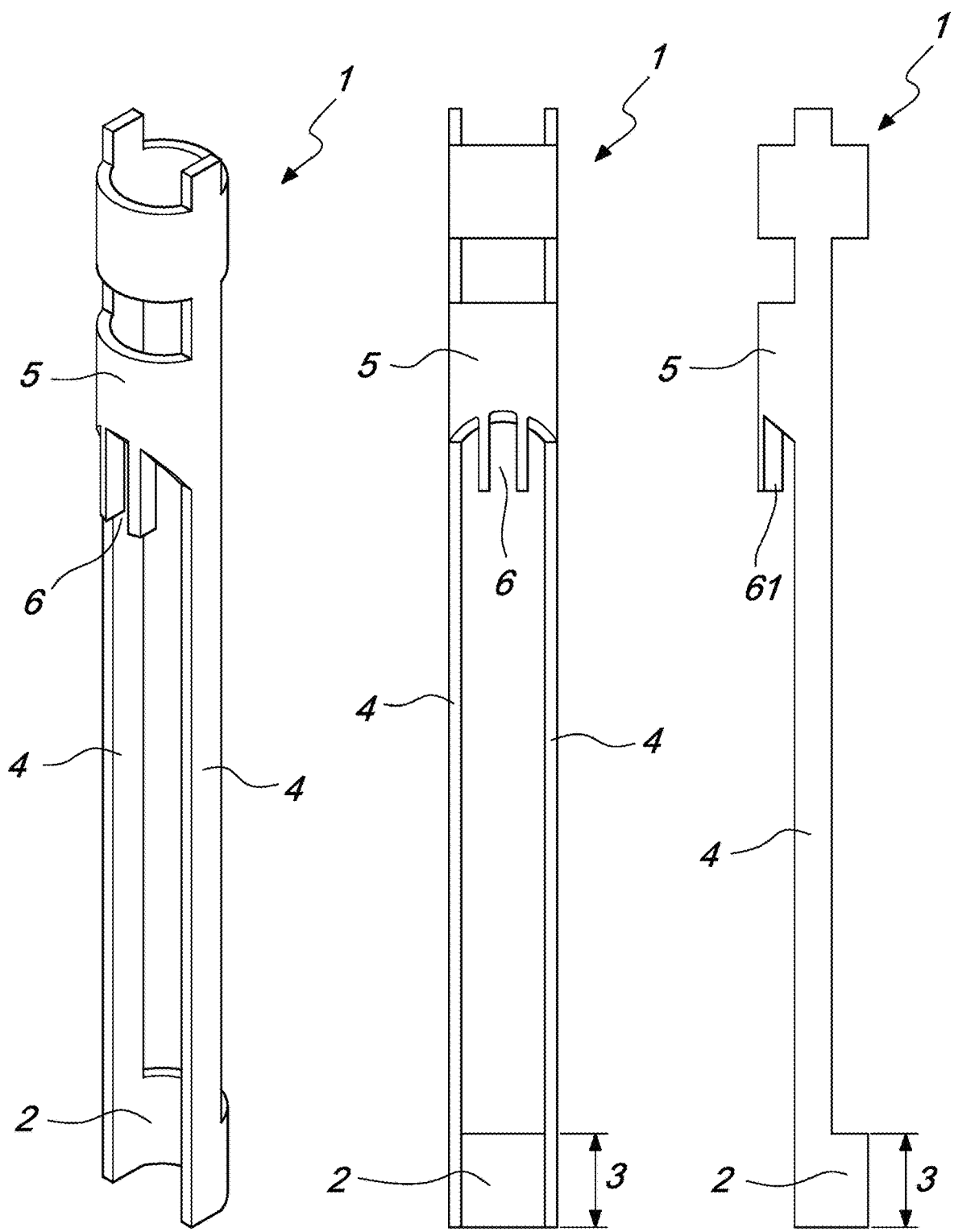
FIG. 1 is a perspective view of the surgical guide according to the present invention.
FIG. 2 is a front view of the guide.
FIG. 3 is a side view of the guide.
Figure 4:
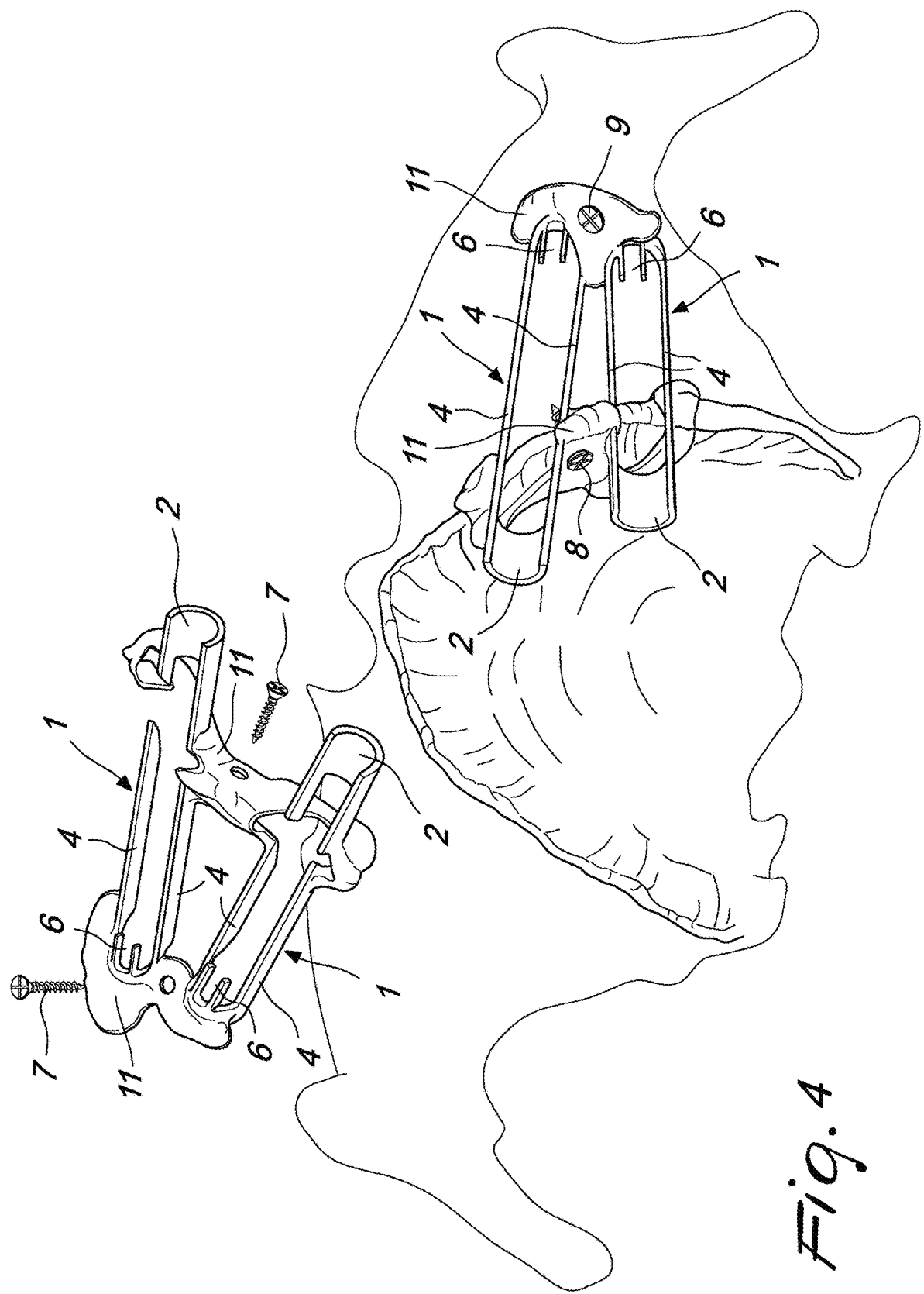
FIG. 4 is a schematic perspective view of two double guides, of which one is arranged in the position for use.
Figure 5:
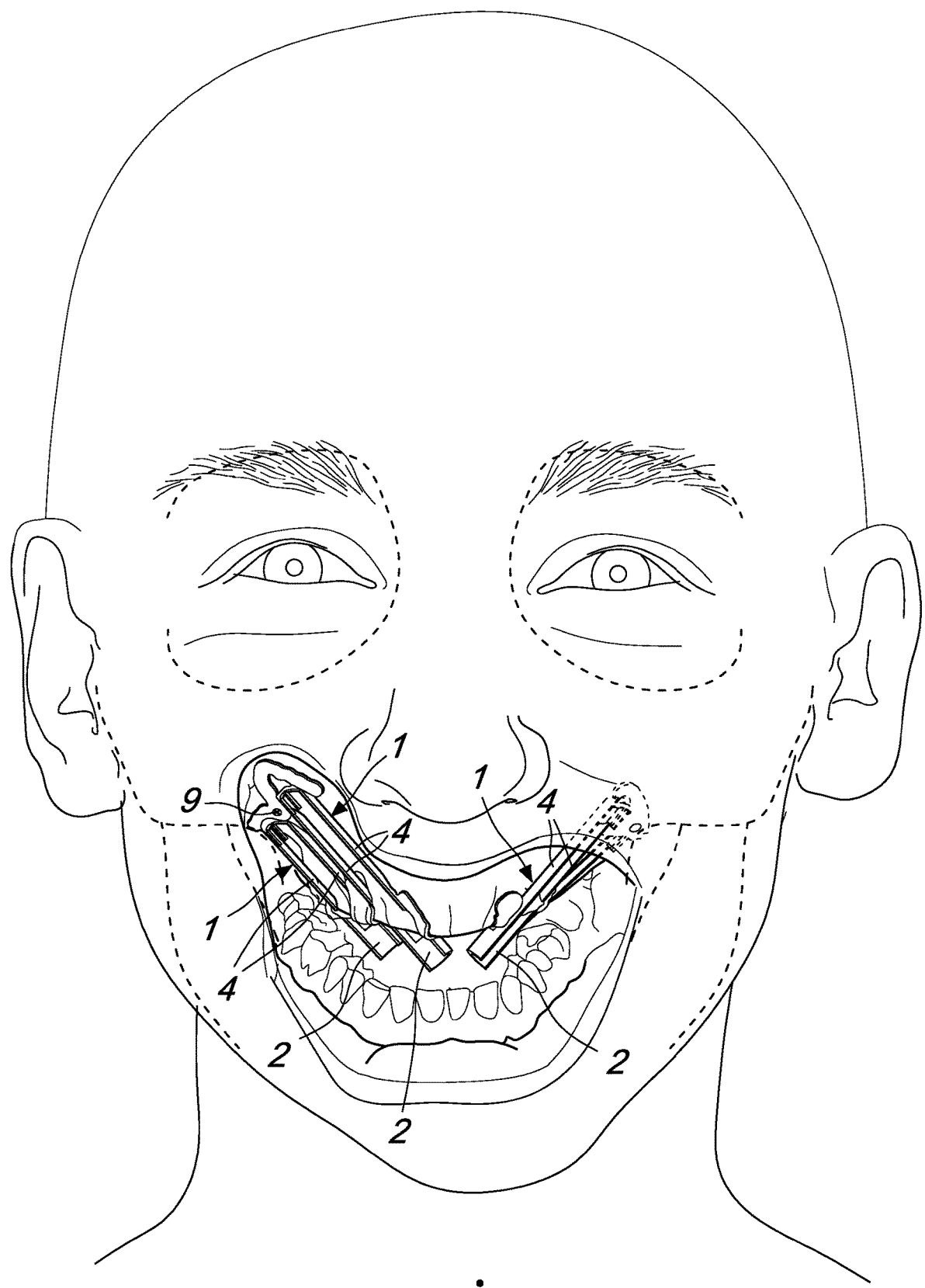
FIG. 5 is a front view which shows schematically the placement of two guides.
Figure 6:
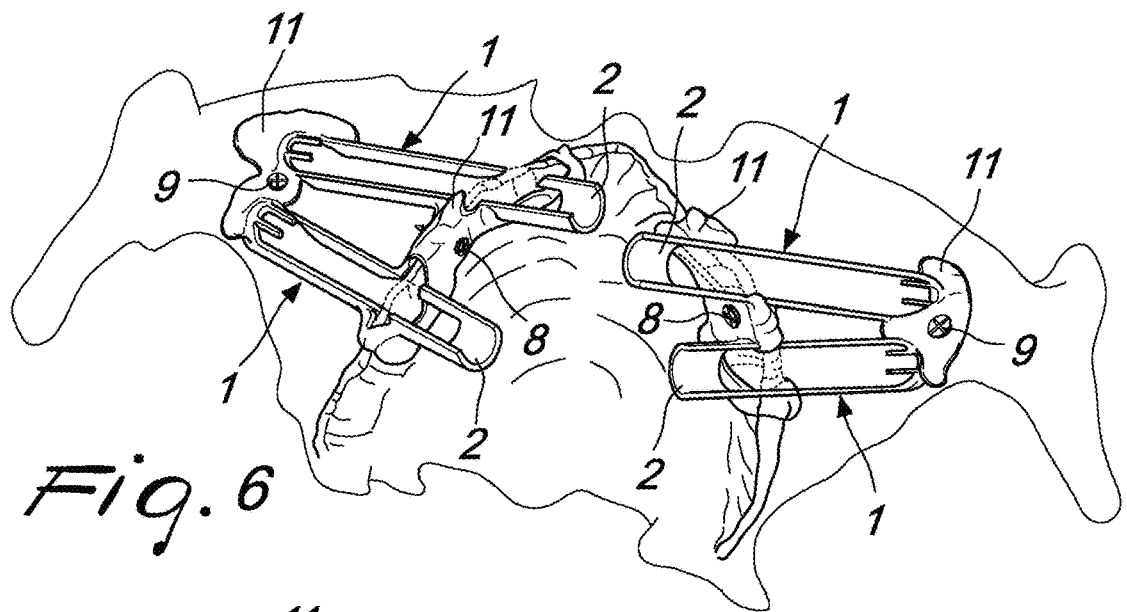
FIG. 6 is a bottom view of the palate, showing two guides in position.
Figure 7:
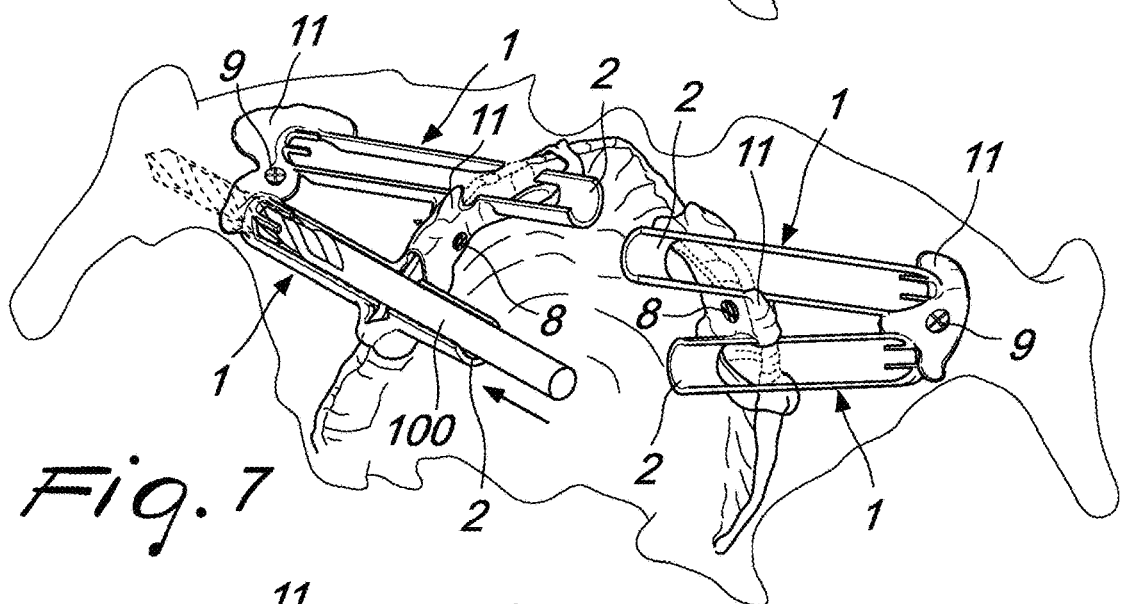
FIG. 7 is a view, similar to the preceding one, showing the application of a burr.
Figure 8:
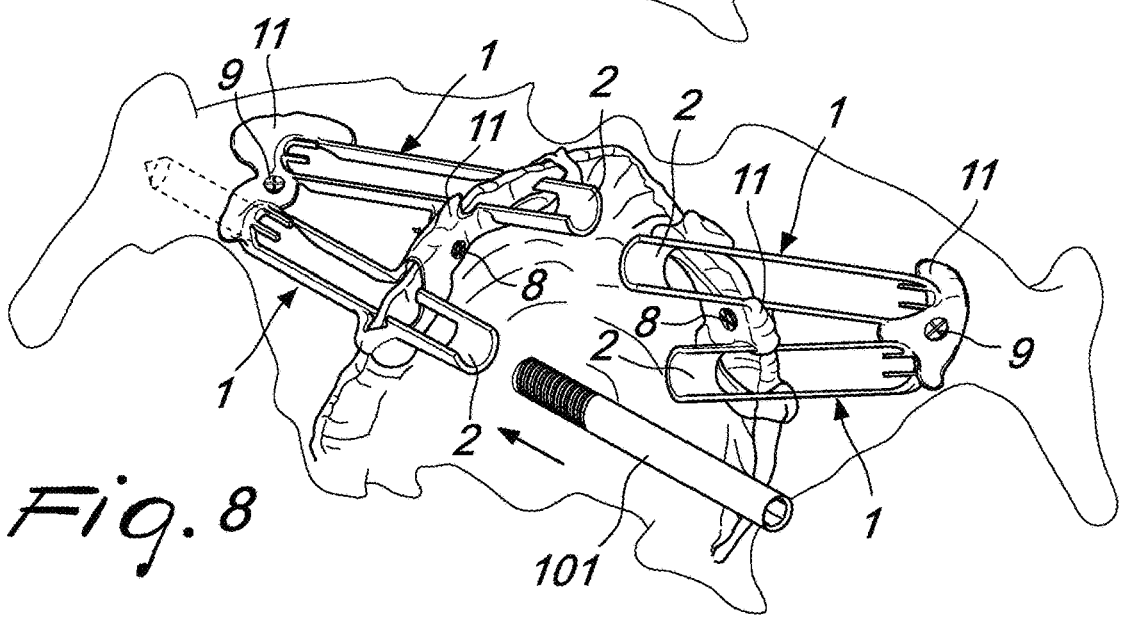
FIG. 8 is a view of the step of insertion of an implant.
Figure 9:
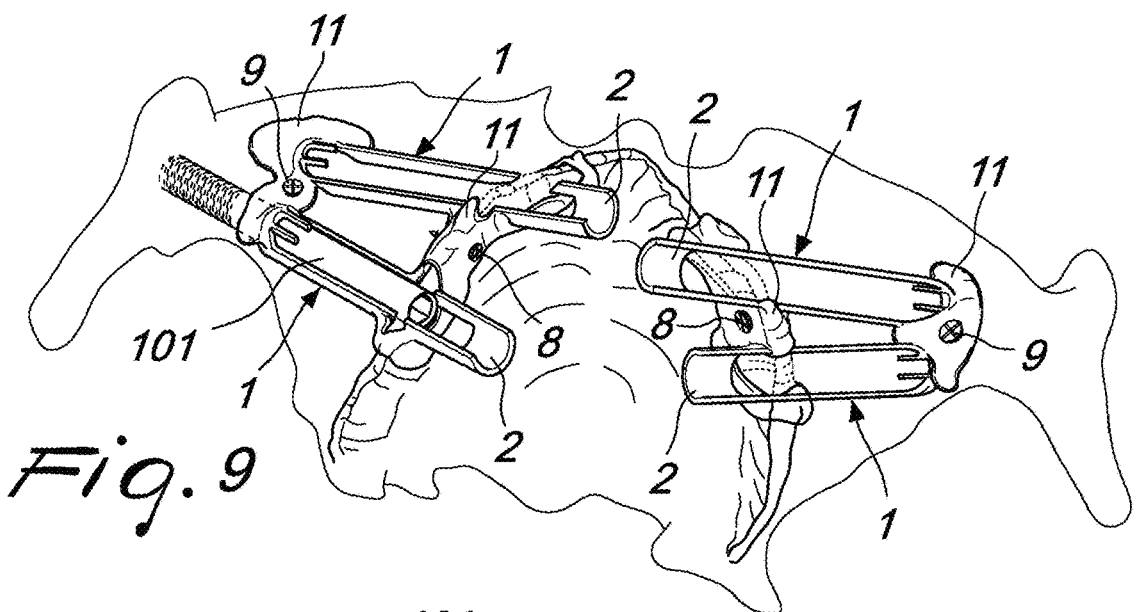
FIG. 9 is a view of an inserted implant.
Figure 10:
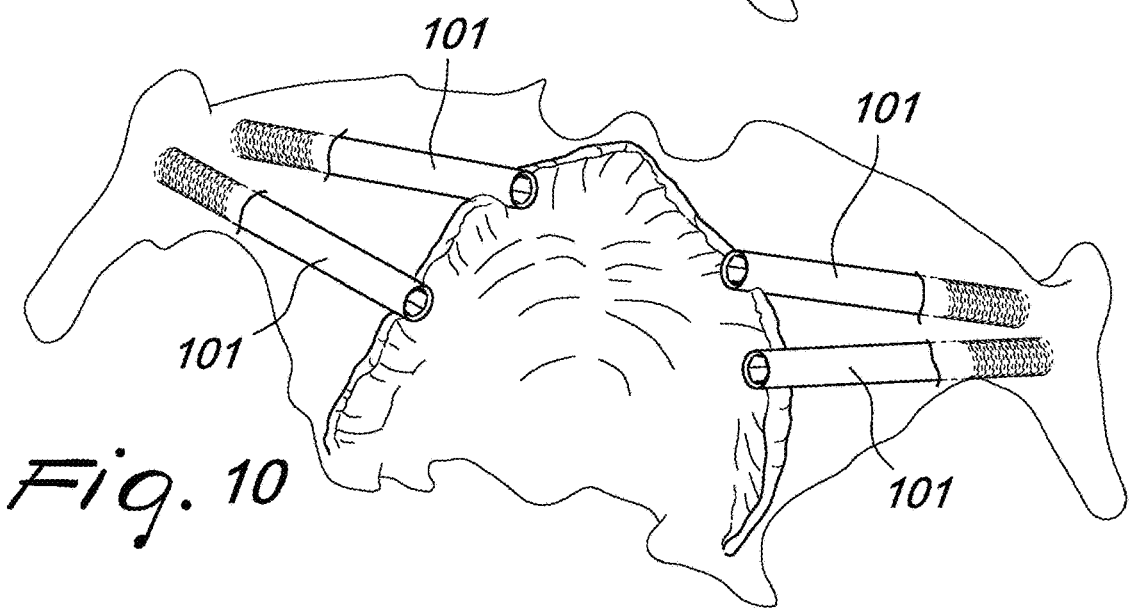
FIG. 10 is a view of the implants inserted and of the removed guide.

With reference to the cited figures, the surgical guide according to the invention, designated generally by the reference numeral 1, has a half-bushing 2, in a crestal maxillary position with vestibular concavity, adapted to determine both the working depth, i.e., the vestibulo-palatal penetration, referenced by the segment 3, and the direction of perforation that a burr 100 must follow.

The guide 1 also includes two lateral bars 4 that unambiguously direct the sliding of the burrs 100 and of the implant 101 in space, and a complementary half-bushing 5, which is opposite to the crestal bushing 2 and have a concavity directed medially; the half-bushing 5 is arranged at the zygomatic region.

The complementary half-bushing 5 acts as a guide for the surface direction and orientation of the burrs 100 and of the implant 101.

The mutually opposite half-bushings 2 and 5 have a U shape or semicircular shape with the concavity directed toward the longitudinal median axis of the guide formed between the bars which extend parallel thereto.

In other words, the opposite half-bushings 2 and 5 define the "hole" in which the burr and then the implant are inserted; the burr and the implant represent a "shaft" which, with the "hole", constitutes a "prismatic pair", providing a system with a single degree of freedom, i.e., the motion of the shaft, i.e., the burr 100 and the implant 101, can occur only along one direction, which in this case coincides with the axis of the prismatic cavity formed by the half-bushings 2, 5.

With this system, the axis of the "hole" coincides with the axis of the burr 100 and with the axis of the implant 101.

The half-bushing 2 arranged on the maxillary bone has a U-shaped cross-section and dimensions suitable to guide the work of the burrs 100 and the subsequent positioning of the implant 101.

The complementary half-bushing 5 also has a guide 6 for the first burr 100, the pilot burr, as will be described hereinafter.

The guide 6 is constituted, in this specific case, by a guide slot defined by a pair of tabs 61, which extend from the complementary half-bushing 5 in the direction of the half-bushing 2.

Figure 11:
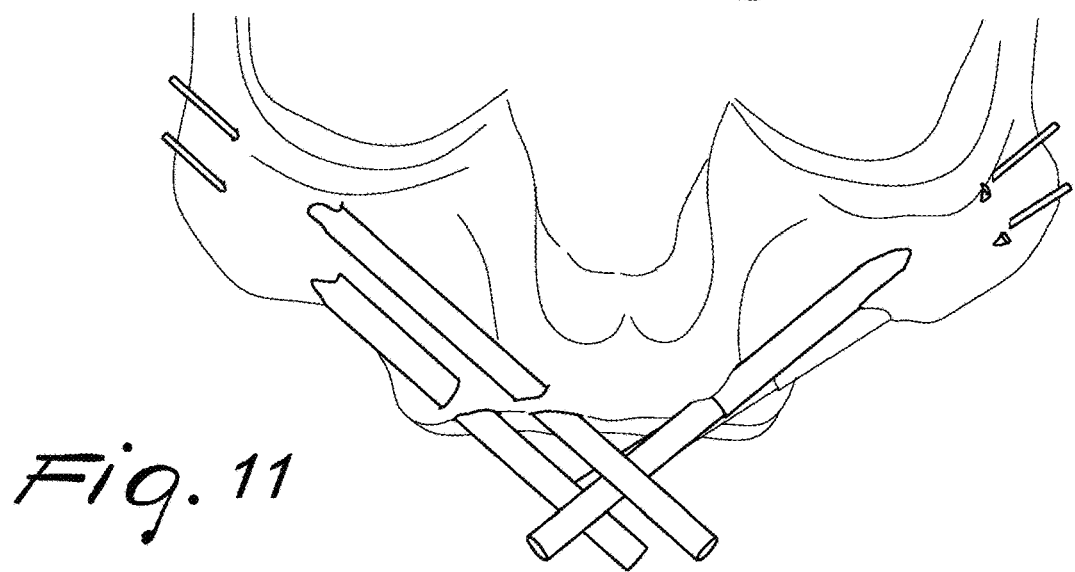
FIG. 11 is a schematic view of the virtual placement of the implants performed by the software.

The surgical guide according to the present invention is particularly studied to be used in a particular zygomatic implant guided surgery technique which provides, as a first step, the acquisition of a multilayer CT (computerized tomography). This CT is processed by software which allows to virtually position the implants in terms of orientation, position and measurements, as shown schematically in FIG. 11.

A second software is used to read the position of the implants, in relation to the bone, decided by the surgeon, and at the same time to virtually build a surgical guide with bone anchoring which allows to reproduce, with the surgical burrs, the exact path and placement of the implants to be inserted, exactly as in the virtual project.

In a first step, a pilot mill, preferably constituted by a 2.5 mm diamond mill, is used, for determining the center of the circumference of the future implant 101 and which will be the insertion point for the drill of the actual burr.

A second burr, termed "cortical burr", allows the erosion of the excess bone level and the forming of the bone hollow for the resting of the future implant. This burr is used by resting its nonworking drill in the spot provided by the pilot burr and by tilting it and pushing it on the bone, consuming the bone with its active part; the final position of the burr is determined by the stop produced by the maxillary half-bushing 2.

The subsequent burrs are guided by the half-bushings 2 and 5 and by the lateral bars 4, which are constituted by two prismatic shapes with a polygonal base; the prismatic shapes have such an extension as to connect the two half-bushings and are arranged tangentially to the ends of the diameter of the implant and parallel to each other.

These features allow to guide the burr 100 and to remove the guide 1 after inserting the implant 101 in the bone.

Another feature of the guide 1 is constituted by its extension by means of stabilization flanges 11 in the palate region and the zygomatic fossa; its stabilization occurs by means of self-tapping locking screws or pins 7, which are inserted in maxillary holes 8 and zygomatic holes 9 provided for this purpose.

The files that contain the projects of the customized guides are sent to a center that is specialized in laser melting processes, thus producing the actual titanium guides with a high level of precision.

The surgical technique provides for sculpting a mucosal flap, performing a bone peeling process that is suitable to expose the maxillary and zygomatic anatomical structures, and to accommodate the guide according to the present invention, which is fixed to the bone by means of pins 7.

Once the intimate bonding between the bone and the plate has been verified, one proceeds with the sequence of burrs with the goal of providing a bone hollow for guiding the subsequent insertion of the implant.

The seating of the implant is precise because the bone hollow on the maxillary bone and the hole inside the cheekbone (implant neo-receptacle) allow a single placement in terms of direction and depth and this occurs because during all the surgical steps the operator is guided by the two half-bushings 2 and 5, applying thereon an adequate pressure both with the burrs and with the implant itself at the time of its insertion.

The technique thus provided allows to use implants with preset diameter and length and even to prepare a temporary screw-on prosthesis in order to provide an immediate prosthetic load.

An example of execution of the surgical technique based on the guide according to the present invention is described hereinafter.

First of all, a multilayer TC acquisition is performed and the file is loaded in the dedicated software, which provides the virtual placement of the implants, in terms of depth and angle, on a CAT in relation to the prosthetic design.

The file is imported in another software in order to design the surgical guide according to the present invention, which is made to size with respect to the bone of the patient and on the basis of the placement of the implant decided in the preceding software.

The file is sent to the manufacturer of the guide, which manufactures it by laser melting.

The guide is tested on a "real model", printed from the files of the CAT (guide project validation), current tolerance 0.2 tenths of a centimeter.

The 0.3 to 0.6 mm multilayer CT is acquired which includes the maxillary bone and the cheekbones in full and is extended up to the complete eye socket; the CT is preferably performed with a barium-based prosthetic radiological guide.

The DICOM file of the CAT is imported into the software for planning and matching the reference points of the files of the digitized radiological guide.

The zygomatic implant is extracted from the library and is positioned in three dimensions with a maxillary/zygomatic orientation, according to the surgical-prosthetic project. The software includes an implant library with diameters and lengths of the implants to be inserted.

The placement of the crestal half-bushing 2 is performed by exporting it from the "bushings" library. The maxillary half-bushing 2 and the complementary half-bushing 5 have different lengths depending on the length of the implant that will be inserted. These two members constitute the guide of the burr in a unique direction.

The maxillary half-bushing 2, together with the remaining portion of the complementary half-bushing 5, constitute an ideal prism (hole) through which only and exclusively one trajectory is possible for a zygomatic implant (shaft). Specifically, the "hole" is divided into two equivalent halves, the maxillary half-bushing 2 and the zygomatic complementary half-bushing 5, which are arranged in a mutually opposite manner: the half-bushing 2 with a vestibular concavity and the complementary half-bushing 5 with the concavity directed toward the zygomatic bone plane.

The lateral bars 4 are arranged from the half-bushing 2 to the complementary half-bushing 5. These bars, which have a prismatic shape, are tangent to two opposite points of the circumference of the implant and are mutually parallel. These bars act as an additional guide of the shaft (implant) during its travel from the half-bushing 2 to the complementary half-bushing 5 (hole).

The slot with guiding pin for the first burr is imported.

The slot, half-bushing, complementary half-bushing, lateral bars, zygomatic slot for the first burr are aligned with the designed zygomatic implants.

One then proceeds with modeling the guide with bone support, ensuring the stability of the plate, creating a prismatic kinematic pair in which the fixed portion is the guide and the movable portion is the burr.

The guide must have a bone support with an extension from the palate portion, continuing on the maxillary bone, up to the zygomatic portion, extending it to the rear portion of the fossa.

In order to fix the guide to the bone portion, holes are used in a number which is variable according to the extension of the guide and are positioned on the maxillary and zygomatic portion thereof.

The holes have a diameter that is capable of accepting a self-tapping screw in order to fix the guide integrally to the bone portion.

The burr moves inside the bushings (shaft/hole) with a predefined degree of tolerance, for example H6/h6 ISO Table, defined as "good" precision, on a scale of four values: high, good, medium, coarse.

Finally, the file is sent to the guide production location and is preferably manufactured in titanium by means of the laser melting method.

In practice it has been found that the invention achieves the intended aim and objects, providing a guide that is studied particularly for guided surgery on zygomatic implants for dental prostheses.

An important advantage of the guide according to the present invention is that it is removable after inserting the implant or implants in place.

Also, with a single guide it is possible to insert one or more implants, such as in the example shown in FIGS. 4-10, in which two guides are shown, each of which is configured for the application of two implants.

The materials used, as well as the dimensions, may of course be any according to the requirements and the state of the art.

This application claims the priority of Italian patent application No. 102018000006998, filed on 6 Jul. 2018, the content of which is incorporated as reference.

The invention claimed is:

1. A device for guided surgery on zygomatic bone implants for dental prostheses, the device comprising:
   at least one guide comprising a first half-bushing and a second half-bushing which are complementary and connected by a pair of bars;
   wherein:
   the first and second half-bushings and the bars define a common longitudinal median axis between them;
   the first half-bushing is spaced apart from the second half-bushing in a direction along the median axis with the pair of bars therebetween such that the first and second half-bushings do not overlap each other when viewed from a direction perpendicular to the median axis;
   the first and second half-bushings have a U-shaped or semicircular cross-section with mutually opposite concavities directed toward the median axis; and
   the first and second half-bushings and the bars are arranged such that an implement used during the guided surgery, when received by the first and second half-bushings, is movable only along the median axis and is rotatable about an axis of rotation that coincides with the median axis.

2. The device according to claim 1, wherein the second half-bushing has a guide slot in which the implement is receivable.

3. The device according to claim 2, wherein the guide slot comprises a pair of tabs which extend from the second half-bushing in a direction along the median axis toward the first half-bushing.

4. The device according to claim 1, further comprising at least one stabilization flange by which the device is fixable to a bone part.

5. The device according to claim 4, wherein the device is fixable in a palate region and zygomatic fossa via the at least one stabilization flange.

6. The device according to claim 4, wherein the device is fixable to the bone part via self-tapping locking screws or pins inserted in maxillary holes.

7. The device according to claim 4, wherein:
   the at least one guide comprises at least two guides; and
   the at least one stabilization flange mutually connects the at least two guides.

8. The device according to claim 1, wherein the implement comprises at least one of a burr and an implant.

* * * * *